US006817333B2

(12) United States Patent
Wang et al.

(10) Patent No.: US 6,817,333 B2
(45) Date of Patent: Nov. 16, 2004

(54) PISTON AND CYLINDER BORE HAVING IMPROVED SCUFFING RESISTANCE

(75) Inventors: Yucong Wang, West Bloomfield, MI (US); Donald L. Brown, Midland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/630,424

(22) Filed: Jul. 30, 2003

(65) Prior Publication Data

US 2004/0045521 A1 Mar. 11, 2004

Related U.S. Application Data

(62) Division of application No. 10/238,654, filed on Sep. 10, 2002, now Pat. No. 6,684,844.

(51) Int. Cl.[7] .................................................. F16J 1/04
(52) U.S. Cl. ................................. 123/193.2; 123/193.6
(58) Field of Search .......................... 123/193.2, 193.6; 29/888.04, 888.048, 888.06, 888.061

(56) References Cited

U.S. PATENT DOCUMENTS

| | | | | | |
|---|---|---|---|---|---|
| 4,075,934 | A | * | 2/1978 | Wacker et al. | 92/159 |
| 4,828,584 | A | * | 5/1989 | Cutler | 51/307 |
| 4,987,865 | A | * | 1/1991 | Schenkel | 123/193.6 |
| 5,549,086 | A | * | 8/1996 | Ozawa et al. | 123/193.6 |
| 5,884,600 | A | * | 3/1999 | Wang et al. | 123/193.6 |
| 6,187,388 | B1 | * | 2/2001 | Popoola et al. | 427/455 |

* cited by examiner

*Primary Examiner*—Marguerite McMahon
(74) *Attorney, Agent, or Firm*—Leslie C. Hodges

(57) ABSTRACT

A piston assembly is provided for use in an engine. The piston assembly includes a piston body including a crown with a skirt extending from the crown. The skirt has an exterior surface. The exterior surface has a surface finish in a wave form with peaks and valleys, and having a roughness total between approximately 6 and 8 micrometers. The roughness total is defined as the difference between the highest peak and lowest valley within an assessment length. The surface finish has an approximate peak-to-peak distance between 0.18 and 0.23 mm within the assessment length. A composite coating is provided over the exterior surface.

4 Claims, 4 Drawing Sheets

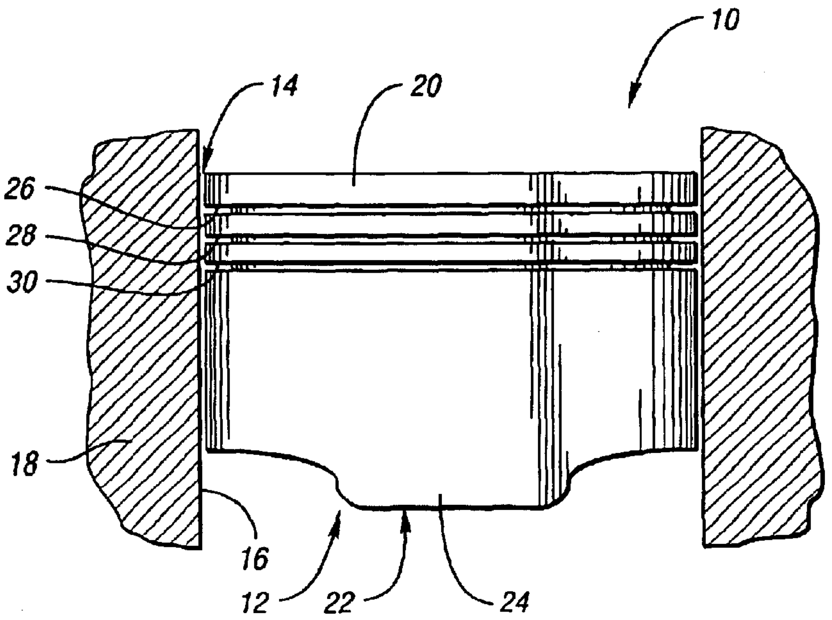
*Fig. 1*
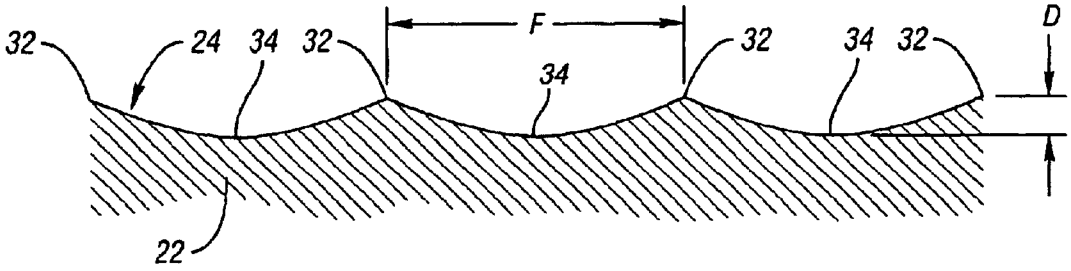
*Fig. 2a*
| | DEFINITION | UNIT | SURFACE MACHINING | |
|---|---|---|---|---|
| | | | ROUGH (PRIOR ART) | SMOOTH |
| D(Rt) | DEPTH | µm | 13-19 | 6-8 |
| F | FEEDRATE | mm/REVOLUTION | 0.32 | 0.22 |
*Fig. 2b*

SCUFFING LOAD

| | PISTON | LINER (BORE) | SCUFFING LOAD (LB) |
|---|---|---|---|
| 1 | NO COATING, ROUGH | ROUGH | 225, 250, 200, 225; AVE. 225 |
| 2 | NO COATING, ROUGH | SMOOTH | 250, 275, 250; AVE. 258 |
| 3 | NO COATING, SMOOTH | ROUGH | 250, 275, 250; AVE. 258 |
| 4 | NO COATING, SMOOTH | SMOOTH | 225, 275; AVE. 250 |
| 5 | NCC COATING, ROUGH | ROUGH | 150, 175, 175, 200, 175; AVE. 175 |
| 6 | NCC COATING, ROUGH | SMOOTH | 175, 200, 175; AVE. 183 |
| 7 | NCC COATING, SMOOTH | ROUGH | 275, 300, 350; AVE. 308 |
| 8 | NCC COATING, SMOOTH | SMOOTH | 300, 350, 400, 325; AVE. 344 |
| 9 | TIN COATING, ROUGH | ROUGH | 225, 225, 250; AVE.233 |
| 10 | TIN COATING, ROUGH | SMOOTH | 225, 250, 250; AVE. 242 |
| 11 | TIN COATING, SMOOTH | ROUGH | 275,275,275,250; AVE. 269 |
| 12 | TIN COATING, SMOOTH | SMOOTH | 275, 300, 275, 300; AVE. 287 |
| 13 | CPC COATING, ROUGH | ROUGH | 325, 300, 350; AVE. 325 |
| 14 | CPC COATING, ROUGH | SMOOTH | 300, 300, 325; AVE. 308 |
| 15 | CPC COATING, SMOOTH | ROUGH | 425, 400, 375, 375; AVE. 394 |
| 16 | CPC COATING, SMOOTH | SMOOTH | 450, 475, 475; AVE. 467 |

Fig. 5a

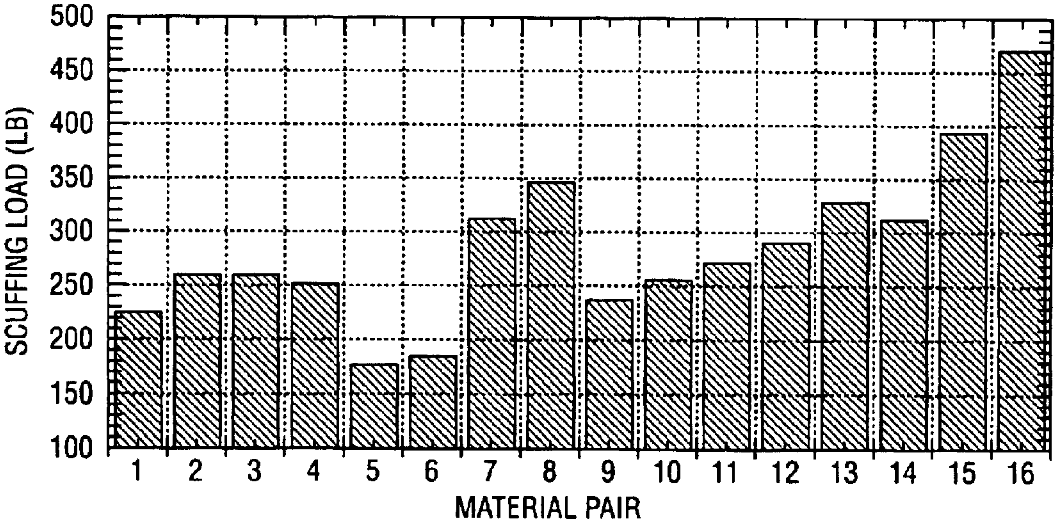

Fig. 5b

PISTON AND CYLINDER BORE HAVING IMPROVED SCUFFING RESISTANCE

CROSS REFERENCE TO RELATED APPLICATION

This application is a divisional of and claims priority to U.S. patent application Ser. No. 10/238,654, filed Sep. 10, 2002 now U.S. Pat. No. 6,684,844, which is hereby incorporated by reference.

TECHNICAL FIELD

The present invention relates to a piston and cylinder for a vehicle engine wherein the piston has a finished exterior surface with a roughness total between approximately 6 and 8 micrometers and peak-to-peak distance of approximately 180 and 230 micrometers, and is coated with a composite coating to reduce scuffing.

BACKGROUND OF THE INVENTION

Modern engines require tight clearance between pistons and cylinder bores for reduced noise, better fuel economy and reduced oil consumption. With the tight clearance, design for scuffing resistance between pistons and cylinder bores becomes a significant issue for automotive manufacturers because scuffing may cause engine failure.

Specifically, scuffing is an adhesive-wear event in which two parts slide against each other in a lubricant-starved condition. Piston skirt scuffing is characterized by a loss of the surface material and burnt or galled surfaces of the skirt and the cylinder bore. When an aluminum piston is used with a cast-iron cylinder bore, scuffing is characterized by the transfer of aluminum from the piston skirt to the cylinder bore surface.

Scuffing typically happens when the lubricating oil film at the interface is broken. The potential exists for this loss of lubrication due to overheating which causes the lubricating oil film to decompose, excessive force between the parts, or insufficient oil at the interface. Scuffing may happen whenever the engine is low on oil and/or low on coolant. Without sufficient coolant, the oil overheats and cannot sufficiently lubricate the piston/cylinder interface. Overfueling may also cause scuffing because the gasoline may wash away the lubricant from the piston surface. Oil pump failure or oil leakage may also result in scuffing because there is simply insufficient oil at the piston/cylinder bore interface.

Accordingly, it is desirable to provide an engine design with reduced scuffing between the piston and cylinder bore.

DISCLOSURE OF THE INVENTION

It has been surprisingly discovered that providing an exterior surface with turning marks between approximately 6 and 8 micrometers in depth and appropriately 180 and 230 micrometers in width with either a composite polymer coating or nickel boron nitride composite plated coating thereon may substantially improve scuffing resistance between the piston and the cylinder bore.

More specifically, the invention provides a piston assembly for use in an engine. The assembly includes a piston body having a crown with a skirt extending from the crown. The skirt has an exterior surface. The exterior surface has a surface finish (or turning marks) in a wave form with peaks and valleys formed by a turning operation, and having a roughness total between approximately 6 and 8 micrometers. The roughness total is defined as the difference between the highest peak and lowest valley within an assessment length. The surface finish has an approximate peak to peak distance between 0.18 and 0.23 mm (180–230 micrometers) within the assessment length. A composite coating is provided over the finished exterior surface.

Preferably, the roughness total is approximately 7 micrometers, and the approximate peak to peak distance is 0.22 micrometers. The exterior surface is finished by a turning operation with a diamond-tipped cutting insert.

The composite coating may be a composite polymer coating (CPC) between approximately 10 and 16 micrometers in thickness. The composite polymer coating may be a polyamide resin having between approximately 5% and 30% by volume graphite particles, or a polyamide resin having between approximately 2% and 10% by volume graphite particles and between approximately 2% and 20% by volume molybdenum disulfide particles. The graphite and molybdenum disulfide particles are fibers with a length between approximately 3 and 15 micrometers and a diameter between approximately 1 and 5 micrometers.

Alternatively, the composite coating may be a Ni—P—BN plated coating including approximately 5% by volume BN (boron nitride) and approximately 3% by weight P (phosphorus). The Ni—P—BN coating has a thickness between approximately 12 and 17 micrometers and an approximate hardness of 50 HRC. The coating is electroplated and has suspended ceramic particles in the electroplating solution co-deposited during electroplating.

The cylinder bore may be prepared by a plateau-honing operation to provide bore surface with a roughness average, Ra, between approximately 0.34 and 0.52 micrometers.

A method is also provided for manufacturing a piston and cast-iron cylinder bore of an engine, wherein the piston includes a piston body having a crown with a skirt extending from the crown, and the cylinder is configured to receive the piston body. The method includes the steps of:

(A) finishing the exterior surface of the skirt in a turning operation with a transverse feed rate of between approximately 0.18 and 0.23 mm/revolution;

(B) applying a composite coating to the finished exterior surface; and (C) honing a bore surface of the cylindrical bore to form a roughness average between approximately 0.34 and 0.52 micrometers.

The above objects, aspects, features, advantages, and other objects, aspects, features and advantages of the present invention are readily apparent from the following detailed description of the best modes for carrying out the invention when taken in connection with the accompanying drawings.

BRIEF DESCRIPTION OF THE DRAWINGS

FIG. 1 shows a side partial cross-sectional view of a piston reciprocating within a cylinder bore in accordance with the present invention;

FIG. 2*a* shows an enlarged schematic cross-sectional view illustrating a surface finish of a piston skirt;

FIG. 2*b* is a tabular illustration of surface characteristics of a prior art piston in comparison with a piston manufactured is accordance with the present invention;

FIG. 5*a* is a tabular illustration of surface characteristics of tested piston and cylinder bores;

FIG. 5*b* is a graphical illustration of the data represented in FIG. 5*a;*

DETAILED DESCRIPTION OF THE PREFERRED EMBODIMENTS

Figure 3:
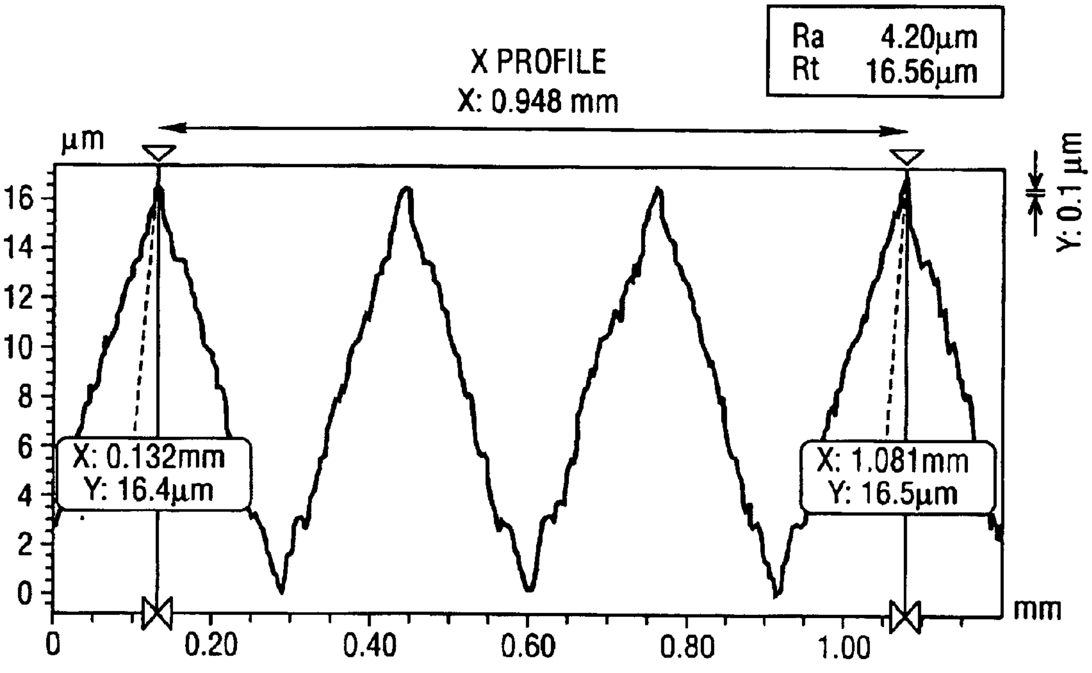
Fig. 3 (PRIOR ART)
FIG. 3 is a graphical illustration of an actual prior art piston surface profile.

The FIG. 1 shows a piston and cylinder assembly 10 for use in a vehicle engine. The piston and cylinder assembly 10 includes an aluminum piston 12 which reciprocates within a cylinder bore 14 defined by an annular bore surface 16 in a cast-iron engine block 18.

The piston 12 includes a crown 20 with a skirt 22 extending from the crown 20. The skirt 22 has an exterior surface 24. A plurality of ring grooves 26, 28, 30 are formed in the crown 20 to receive compression rings and an oil ring (not shown).

The present invention is directed to an improvement in scuffing resistance to prevent transfer of material from the aluminum piston 12 to the annular cylinder bore surface 16. As described below, this improved scuffing resistance is achieved by specific roughness dimensioning of the exterior surface 24 of the piston skirt 22 in conjunction with a composite coating on the exterior surface 24. The scuff resistance may be further enhanced by specific dimensioning of roughness of the annular bore surface 16.

FIG. 2*a* schematically illustrates a cross-sectional view of a machined piston skirt surface 24 of a skirt 22. As the result of a turning operation, the surface 24 of the piston 22 is finished in a wave form with peaks 32 and valleys 34. The dimension F represents the peak-to-peak distance of the wave form, and is defined by the traverse feed rate (mm/revolution) of the turning operation by which the surface 24 is machined. The dimension D represents the difference between the highest peak and lowest valley within an assessment length. The dimension D is also referred to as roughness total (Rt) in this description.

The chart of FIG. 2*b* compares the roughness total and peak-to-peak distance of a prior art piston skirt surface with a piston skirt surface manufactured in accordance with the present invention. As shown, a prior art piston skirt surface typically has a roughness total between 13 and 19 micrometers, whereas a piston skirt manufactured in accordance with the present invention has a roughness total between approximately 6 and 8 micrometers. The peak-to-peak distance of a prior art piston skirt is approximately 0.32 mm. The peak-to-peak distance (F) of a piston skirt manufactured in accordance with the present invention is preferably 0.22 mm, or between approximately 0.18 and 0.23 mm.

FIG. 3 graphically illustrates a wave form profile of a prior art piston skirt surface. As shown, the waves peak at approximately 16 micrometers with the valleys at 0 micrometers. As shown, this profile corresponds with a roughness average (Ra) of 4.2 micrometers, and a roughness total (Rt) of 16.56 micrometers.

Figure 4:
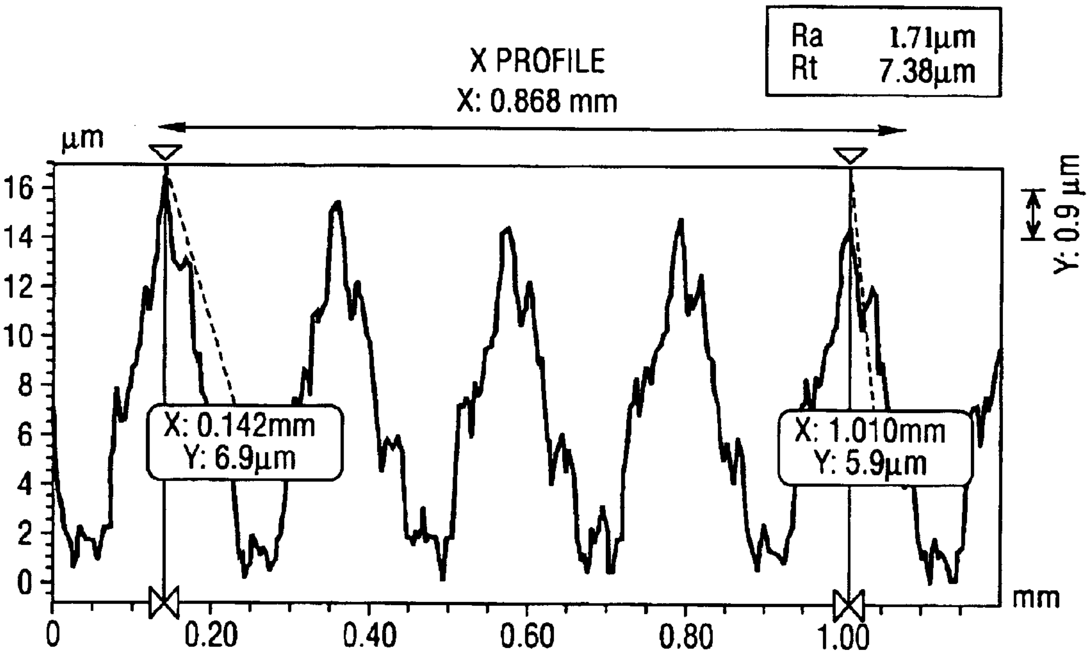
FIG. 4 is a graphical illustration of an actual piston surface profile in accordance with the present invention.

FIG. 4 graphically illustrates a surface finish profile of a piston skirt surface in accordance with the present invention. As illustrated, the peaks of the wave form are in the range of 6 to 7 micrometers, and the valleys are slightly below 0 micrometers. As shown, this translates into a roughness average (Ra) of 1.71 micrometers, and a roughness total (Rt) of 7.38 micrometers over the selected assessment length.

The term surface roughness average (Ra) is defined as the arithmetic average of the distance of a roughness profile, such as those illustrated in FIGS. 3 and 4, from its mean line.

The "assessment length" referenced above is the evaluation length, which is typically five (5) times the cut-off length. It is the amount of material used for measuring the surface characteristics of a machine component. The cut-off length is typically 0.8 mm for a surface with a Ra of 0.1 and 2 micrometers. Turning to FIG. 5*a*, a table is provided illustrating test data from combinations of 16 piston skirt surfaces and cylinder bore surfaces which were tested to determine the load at which scuffing occurs (scuffing load). As used in the piston column of FIG. 5*a*, the terms "rough" and "smooth" correspond with the dimensions illustrated in FIG. 2*b*. For example, a "rough" piston skirt surface would have a depth (D) of 13 to 19 micrometers, and a feed rate or peak-to-peak distance (F) of approximately 0.32 mm, and a "smooth" piston skirt surface would have a depth (D) between approximately 6 and 8 micrometers and feed rate (F) of approximately 0.22 mm.

In the column entitled Liner (bore), the terms "rough" and "smooth" define the following surface characteristics: a rough cylinder bore has a roughness average (Ra) of 0.58 to 0.90 micrometers, and a smooth cylinder bore surface has a roughness average (Ra) in the range of 0.34 to 0.52 micrometers.

The first four rows of FIG. 5*a* illustrate the testing of non-coated pistons within corresponding cylinder bores using various combinations of rough and smooth surfaces as defined above. As shown, in the Scuffing Load column of FIG. 5*a*, and illustrated graphically in FIG. 5*b*, there is a slight improvement between rows 1 and 2 by smoothing the cylinder bore surface. However, smoothing the piston surface does not further increase the scuffing resistance. In fact, as illustrated in row 4, when both the piston and cylinder bore are machined smooth, as defined above, the scuffing resistance (the load at which scuff occurs) actually decreases. This illustrates the common belief in the relevant art that reduction in surface roughness of the piston skirt is ineffective in further improving scuffing resistance. Therefore, the present invention is a surprising discovery in that it has been determined that a specifically dimensioned smooth piston skirt surface in combination with a composite coating can substantially improve scuffing resistance.

Rows 5–8 of FIG. 5*a* and corresponding columns 5–8 of FIG. 5*b* illustrate the testing of a piston having an NCC coating thereon with various rough and smooth combinations for the piston skirt surface and cylinder bore surface. An NCC coating is a nickel ceramic composite coating.

By way of example, the NCC coating may be a Ni—P—BN plated coating which is applied via conventional electroplating with suspended ceramic particulate in the electroplating solution which is co-deposited during plating. A Ni—P—BN coating contains approximately 5% by volume BN (boron nitride). The BN particulate is 4 micrometers in diameter and less than 1 micron in thickness. The phosphorus content is 3% by weight. The coating thickness is 12 to 17 micrometers, with a hardness of approximately 50 HRC.

Comparing rows 7 and 8 of FIG. 5*a* with rows 5 and 6 of FIG. 5*a*, the scuffing resistance is improved by approximately 100% by providing a "smooth" finish on the piston skirt surface, as "smooth" is defined in FIG. 2*b*. This finding is very surprising in light of the trend illustrated in rows 1–4 wherein a non-coated piston skirt surface is provided with a "smooth" surface finish as defined in FIG. 2*b*, but the scuffing resistance actually decreases.

Rows 9–12 of FIG. 5*a* illustrate a gradual improvement in scuffing resistance of a tin-coated piston skirt surface as the piston skirt surface and cylinder bore surface are made smooth, as defined previously.

Rows 13–16 illustrate the testing of D10-coated pistons in a cylinder bore. Much like of the results of the tests illustrated in rows 5–8 with the NCC coating discussed above, the D10 coating with the smooth piston and cylinder bore surfaces, as "smooth" is defined above, provided dramatic improvement in scuffing resistance. For example, there is a 51% improvement in scuffing resistance between the test results identified in row 14 in comparison with those of row 16. This substantial improvement is achieved merely by providing the piston skirt surface with a smooth surface finish, as defined in FIG. 2*b*.

The D10 is an example of a composite polymer coating (CPC). The CPC coating can be a polyamide resin with 5–30% by volume graphite particles, or a polyamide resin with 2–20% by volume graphite particles and 2–20% by volume molybdenum disulfide particles. The graphite or molybdenum disulfide particles can be short fibers with a length of 3–15 micrometers and a diameter of 1–5 micrometers. The coating thickness is between 10 and 16 micrometers. The CPC coating can be applied onto pistons via spray, silk-screen printing, or pad printing processes. Before coating, the pistons are soaked, cleaned, and dried. After coating, the pistons are air-dried for 5–15 minutes to evaporate the organic carrier in the coating, and then baked at 180°–220° C. for 15–60 minutes for curing.

Figure 6A:
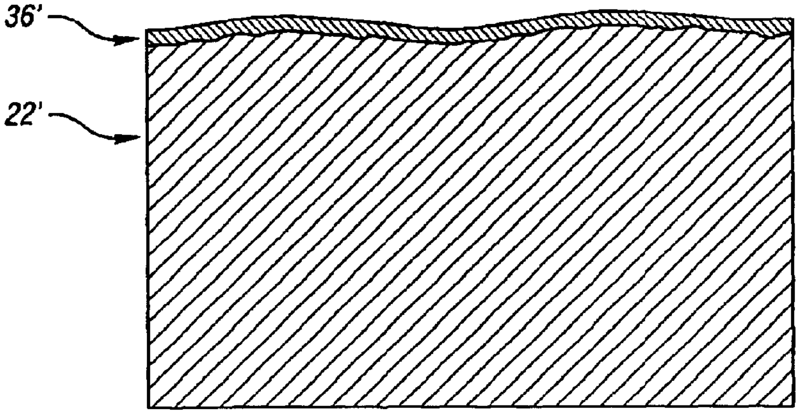
FIG. 6*a* is a cross-sectional view of a prior art NCC-coated piston skirt.

FIG. 6*a* is a further illustration of a prior art rough piston surface finish for a piston skirt 22' having a composite coating 36', which may be a composite polymer coating (CPC) or a nickel-ceramic composite coating (NCC).

Figure 6B:
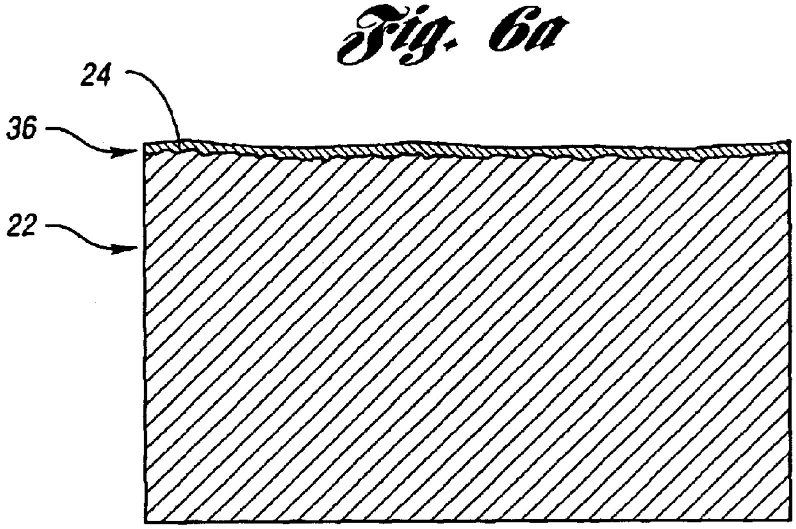
FIG. 6*b* is a cross-sectional view of a NCC-coated piston skirt machined in accordance with the present invention.

FIG. 6*b* shows a similar cross-sectional view of a piston skirt 22 having a composite coating 36 applied over a finished surface 24 of the skirt 22. In comparing FIGS. 6*a* and 6*b*, the roughness difference is apparent.

In preparing the cylinder bore surface discussed above, a plateau honing process is used with silicon carbide honing stones. As described previously, the final average surface roughness (Ra) of the cylinder bore should be in the range of approximately 0.34 to 0.52 micrometers in comparison to the Ra of 0.58 to 0.90 micrometers of common prior art cylinder bore surfaces.

Figure 7:
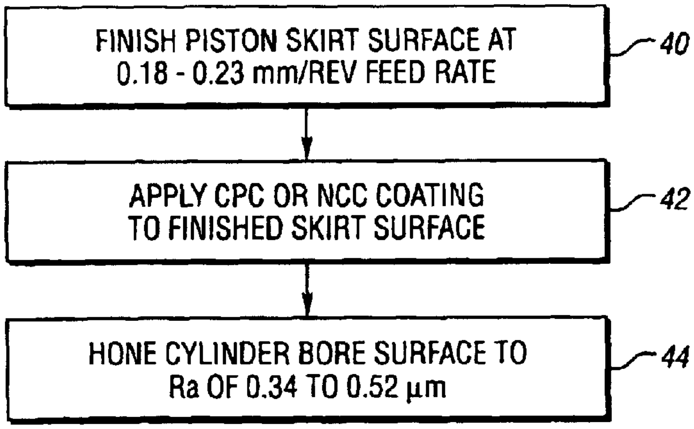
FIG. 7 is a flow chart illustration of a method of manufacturing a piston and cylinder bore in accordance with the present invention.

FIG. 7 provides a flow chart illustration of a method of manufacturing a piston and cylinder bore in accordance with the present invention. As shown, at step 40, the piston skirt surface is finished in a turning machine at a 0.18 to 0.23 mm/revolution transverse feed rate. At step 42, a CPC or NCC coating is applied to the finished skirt surface. At step 44, the cylinder bore surface is honed to a roughness average (Ra) of approximately 0.34 to 0.52 micrometers using a plateau honing process.

In finishing the piston skirt surface, the feed rate may be established as above to provide the desired surface characteristics, or the tool geometry may be altered to provide the desired characteristics. In finishing the cylinder bore surface to the desired Ra values, the honing stones may be altered, the honing speeds may be altered, or the tool geometry and machining coolants may be altered to provide the smoother bore surface.

While the best modes for carrying out the invention have been described in detail, those familiar with the art to which this invention relates will recognize various alternative designs and embodiments for practicing the invention within the scope of the appended claims.

What is claimed is:

1. A method of manufacturing a piston and cast-iron cylinder bore of an engine, the piston including a piston body having a crown with a skirt extending form the crown, and the cylinder configured to receive the piston body, the method comprising:

finishing an exterior surface of the skirt in a turning operation with a transverse feed rate of between approximately 0.18 and 0.23 mm/revolution;

applying a composite coating to the finished exterior surface; and honing a bore surface of the cylinder bore to form a roughness average (Ra) between approximately 0.34 and 0.52 micrometers.

2. The method of claim 1, wherein said transverse feed rate is approximately 0.22 mm/revolution.

3. The method of claim 1, wherein said composite coating is a composite polymer coating.

4. The method of claim 1, wherein said composite coating is a nickel-ceramic composite coating.

* * * * *